United States Patent [19]

Barnett et al.

[11] Patent Number: 5,713,212

[45] Date of Patent: Feb. 3, 1998

[54] APPARATUS AND METHOD FOR GENERATING AIR STREAM

[75] Inventors: Gregory H. Barnett, Costa Mesa; David V. Algas, Huntington Beach; Franklin D. Farrington, Long Beach, all of Calif.

[73] Assignee: McDonnell Douglas Corporation, St. Louis County, Mo.

[21] Appl. No.: 797,763

[22] Filed: Feb. 7, 1997

[51] Int. Cl.$^6$ ............................................. F25B 1/00
[52] U.S. Cl. .......................... 62/116; 62/401; 62/500
[58] Field of Search ........................ 62/5, 116, 500, 62/401, 910, 86

[56] References Cited

U.S. PATENT DOCUMENTS

| | | | |
|---|---|---|---|
| 1,952,281 | 3/1934 | Ranque | 62/5 |
| 2,731,811 | 1/1956 | Levitt | 62/5 |
| 2,893,214 | 7/1959 | Hendal | 62/910 |
| 3,200,607 | 8/1965 | Williams | 62/401 |
| 3,688,770 | 9/1972 | ONeill | 62/401 |
| 4,321,801 | 3/1982 | Collard, Jr. | 62/500 |
| 5,415,224 | 5/1995 | Koch et al. | 62/401 |
| 5,440,886 | 8/1995 | Malakee et al. | 62/500 |

OTHER PUBLICATIONS

J.H. Keenan and E.P. Neumann, "A Simple Air Ejector", Journal of Applied Mechanics, Jun. 1942, pp. A-75-AB1.

*Primary Examiner*—Ronald C. Capossela
*Attorney, Agent, or Firm*—Brooks & Kushman P.C.

[57] ABSTRACT

An apparatus for generating an air stream that is substantially-columnated about a given axis includes a converging-diverging nozzle, a manifold in fluid communication with the nozzle, and a compressor supplying a quantity of compressed air to the manifold to induce a first air flow through the nozzle. The first air flow is characterized by sonic flow at the nozzle throat and supersonic flow at the nozzle exit. The supersonic first air flow exiting the nozzle is directed into one end of an elongate tube. The thus-directed first air flow induces a second flow of ambient air into the one end of the tube. The first air flow mixes with the second air flow within the tube and exits as an air stream that is substantially columnated about the axis of the tube.

14 Claims, 2 Drawing Sheets

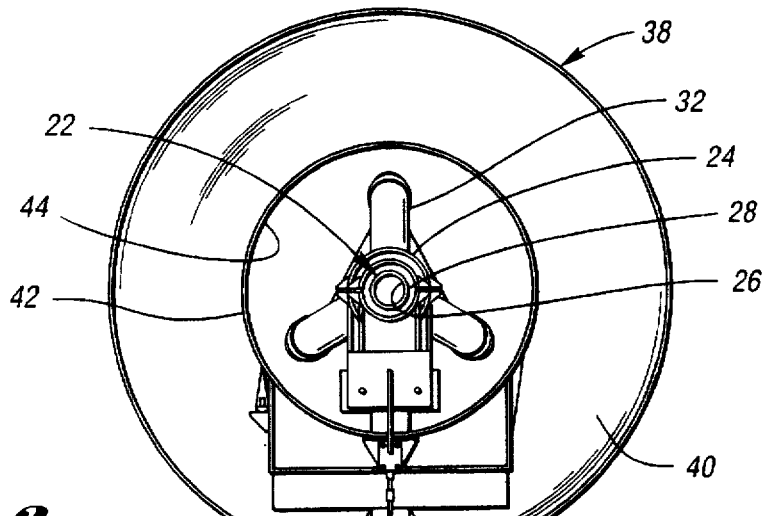

Fig. 3

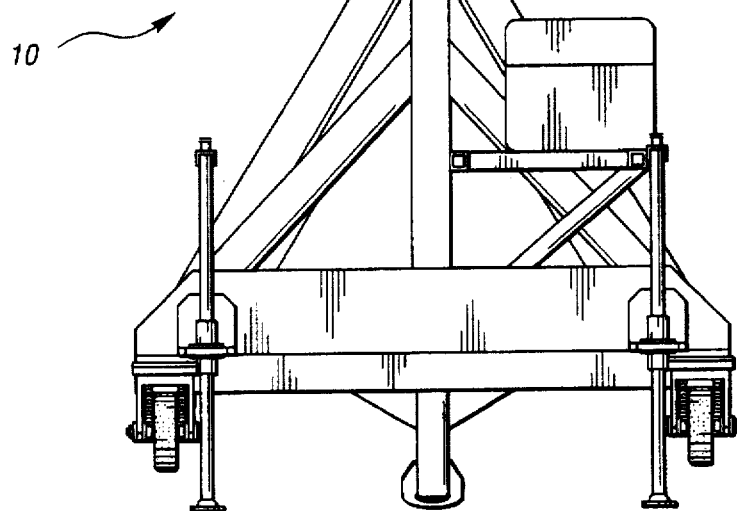

Fig. 4

| POSITIONING TUBE ALONG DRIVING PROPELLER AXIS WITH FIRST END OF TUBE PROXIMATE TO PROPELLER |
|---|
| SUPPLYING COMPRESSED AIR TO NOZZLE TO ACHIEVE SUPERSONIC FLOW AT NOZZLE EXIT |
| DIRECTING SUPERSONIC NOZZLE EXIT FLOW INTO SECOND END OF TUBE TO INDUCE SECOND AIR FLOW INTO SECOND END OF TUBE |
| MIXING THE FIRST AIR FLOW WITH THE SECOND AIR FLOW IN A LONGITUDINAL SECTION OF THE TUBE |

APPARATUS AND METHOD FOR GENERATING AIR STREAM

TECHNICAL FIELD

The present invention relates generally to methods and apparatus for generating a relatively-high-velocity air stream that is substantially columnated about a given axis.

BACKGROUND ART

Apparatus and methods for generating air streams have many uses, including the testing of air-driven devices. In some cases, it is desirable to generate a relatively-high-velocity air stream that is substantially columnated about a given axis. For example, the prior art has long recognized the need for an alternate source of electrical power aboard an aircraft in flight in the event of failure of the aircraft's primary electrical-power-generating systems, e.g., generators mechanically coupled to the aircraft's main engines. Under one prior art approach, an air-driven generator having a variable-pitch propeller is deployed from a storage position within the aircraft's fuselage into an operative position in the airstream outside of the fuselage, whereupon the propeller drives a generator to provide the requisite emergency power. The variable-pitch propeller regulates the speed at which the generator is driven irrespective of the relative velocity of the driving airstream in order to maintain the nominal 400 Hz frequency power required by many modern aircraft systems, provided that the airstream has a relative velocity greater than about 120 knots equivalent air speed.

Upon periodic maintenance, repair or replacement of an aircraft's air-driven generator, a functional test must be performed to ensure that the air-driven generator supplies the required electrical power to aircraft systems before the aircraft can be returned to normal service. In accordance with the prior art, the aircraft is then taken on a test flight to confirm operability of the air-driven generator. Alternatively, the air-driven generator is ground-tested by deploying the air-driven generator from within the fuselage, and directing the output of a cart-mounted turbine engine or diesel-powered turbofan blower toward the deployed generator's propeller. And, while the use of a cart-mounted turbine engine or diesel-powered turbofan blower obviates the need for a costly test flight, such prior art ground-testing methods themselves require costly, dedicated, high-maintenance-cost equipment, the availability of which is often limited.

DISCLOSURE OF INVENTION

It is an object of the invention to provide a low-cost, low-maintenance apparatus and method for generating a relatively-high-velocity air stream that is substantially columnated about a given axis.

It is also an object of the invention to provide a low-cost, low-maintenance apparatus and method for testing an air-driven apparatus, such as an aircraft's air-driven generator, which utilizes compressed air provided by commonly-available aircraft ground support equipment, such as aircraft engine ground start carts.

In accordance with the invention, an apparatus for generating a desired air stream that is substantially-columnated about a first axis includes a converging-diverging nozzle defining a nozzle entrance, a nozzle throat and a nozzle exit. A manifold, in fluid communication with the nozzle entrance, supplies air to the nozzle entrance at a first stagnation pressure and a first stagnation temperature. The air supplied to the nozzle entrance induces a first flow of air through the nozzle and out of the nozzle exit, characterized by a choked flow condition, or sonic flow, at the nozzle throat and a supersonic flow condition at the nozzle exit. While the invention contemplates use of any suitable source with which to provide air at the stagnation pressure and the stagnation temperature to the manifold, the apparatus may conveniently include a compressor which supplies compressed air to the manifold at a pressure and temperature sufficient to maintain the first flow through the nozzle as described above.

An apparatus in accordance with the invention further includes an elongate tube extending along the first axis and defining a tube entrance and a tube exit. The tube includes a longitudinal flow-mixing section, preferably of substantially-constant cross-sectional area, with the area of the tube mixing section being greater than the cross-sectional area of the nozzle throat. The first air flow exiting the nozzle is directed into the tube entrance to induce a second flow of air at an ambient pressure and an ambient temperature into the tube entrance. The first air flow mixes with the second air flow in the tube mixing section and then exits the tube at a velocity greater than about 100 knots.

In accordance with the invention, an exemplary apparatus employs a first stagnation pressure that is substantially greater than the ambient pressure in order to ensure that the first air flow is characterized by supersonic flow at the nozzle exit. Similarly, the first stagnation temperature is preferably substantially greater than the ambient temperature to ensure such supersonic flow.

And, while the invention contemplates use of any suitable ratio of tube mixing section area to nozzle throat area with which to achieve the desired air stream, the ratio of tube mixing section area to nozzle throat area is preferably no greater than about 100, particularly when a tube exit velocity greater than about 120 knots is desired. Similarly, while the nozzle throat may be positioned in any suitable location from which to direct its exiting supersonic air flow into the tube entrance, the cross-sectional area of the tube entrance is preferably greater than the tube mixing section area, with the nozzle throat being preferably positioned along the first axis intermediate the tube entrance and the tube mixing section.

Under the invention, a method for generating a desired air stream that is substantially columnated about a first axis includes supplying a quantity of compressed air at a first stagnation pressure and a first stagnation temperature to a manifold which is itself in fluid communication with a converging-diverging nozzle. The air thus-supplied to the nozzle induces a first air flow through the nozzle and out the nozzle exit characterized by a choked flow condition at the nozzle throat and a supersonic flow condition at the nozzle exit. The method further includes directing the first air flow out the nozzle exit into one end of an elongate tube extending along the first axis. The thus-directed first air flow, in turn, induces a second flow of air at an ambient pressure and an ambient temperature into the same end of the tube, whereupon the first and second air flows mix together in a longitudinal section of the tube and exit from the other end of the tube at a velocity greater than about 100 knots.

In a preferred method for generating the substantially-columnated air stream, particularly where exit velocities greater than perhaps about 120 knots, the longitudinal mixing section of the tube has a substantially-constant area in cross-section, with the ratio of the cross-sectional area of the tube mixing section to the nozzle throat area is no greater than about 100.

Thus, in accordance with the invention, an apparatus may be provided for ground-testing an air-driven apparatus, such as an air-driven generator with a driving propeller which is normally deployed from within the fuselage of an aircraft during flight so as to be placed within an air stream traveling at more than perhaps 120 knots. Specifically, in accordance with the invention, the apparatus includes an annular converging-diverging nozzle extending along the first axis and defining a nozzle throat and a nozzle exit, wherein the nozzle throat has a first diameter. The apparatus also includes an elongate cylindrical tube extending along the first axis and defining a tube entrance, a tube exit, and a longitudinal mixing section located between the tube entrance and the tube exit. The tube mixing section has a substantially-constant diameter, with the diameter of the tube mixing section being no greater than about 100 times the diameter of the nozzle throat. The nozzle throat is positioned along the first axis between the tube entrance and the tube mixing section.

The apparatus further includes a manifold in fluid communication with the nozzle, and a compressor supplying a quantity of compressed air at a first stagnation pressure and a first stagnation temperature to the manifold. The quantity of air supplied to the manifold by the compressor induces a first flow of air through the nozzle and out the nozzle exit characterized by sonic flow at the nozzle throat and supersonic flow at the nozzle exit. The first flow of air exiting the nozzle and flowing into the tube entrance induces a second flow of air at an ambient pressure and an ambient temperature into the tube entrance, with the first and second air flows thereafter mixing in the tube mixing section and exiting the tube at a velocity greater than about 100 knots.

Similarly, in accordance with the invention, a method for ground-testing an air-driven apparatus, such as an air-driven generator, includes positioning an elongate tube along the axis of the generator's driving propeller, with a first end of the tube being positioned proximate to the propeller. A quantity of compressed air is supplied to a converging-diverging nozzle at a first stagnation pressure and a first stagnation temperature such that supersonic air flow is induced at the nozzle's exit. The supersonic air flow from the nozzle exit is directed into the second end of the tube which, in turn, induces a second, subsonic flow of air at an ambient pressure and an ambient temperature into the tube's second end. The first air flow mixes with the second air flow in a longitudinal section of the tube, exits from the tube's first end and impinges upon the generator's propeller at a velocity greater than about 100 knots.

As noted above, in order to achieve mixing tube exit velocities greater than about 100 knots and, more preferably in the case of ground-testing air-driven generators, greater than about 120 knots, the cross-sectional area of the tube's longitudinal section exceeds the cross-sectional area of the nozzle throat by a ratio of no greater than about 100.

From the foregoing, it will be appreciated that, in accordance with one feature of the invention, the above ground-testing apparatus and method advantageously utilizes compressed air, which is otherwise supplied by commonly-available aircraft maintenance equipment such as aircraft engine ground start carts, to provide low-cost operability testing of such air-driven generators.

While an exemplary method and apparatus for practicing the invention are illustrated and disclosed, these embodiments should not be construed to limit the claims. It is anticipated that various modifications and alternative designs may be made without departing from the scope of the invention.

BRIEF DESCRIPTION OF DRAWINGS

FIG. 3 is an end view of the constructed embodiment along arrow 3 of FIG. 2; and FIG. 4 is a flow diagram illustrating an exemplary method in accordance with the invention for ground-testing an air-driven generator deployed from within the fuselage of an aircraft using the ground-testing apparatus shown in FIGS. 1-3.

BEST MODES FOR CARRYING OUT INVENTION

Figure 1:
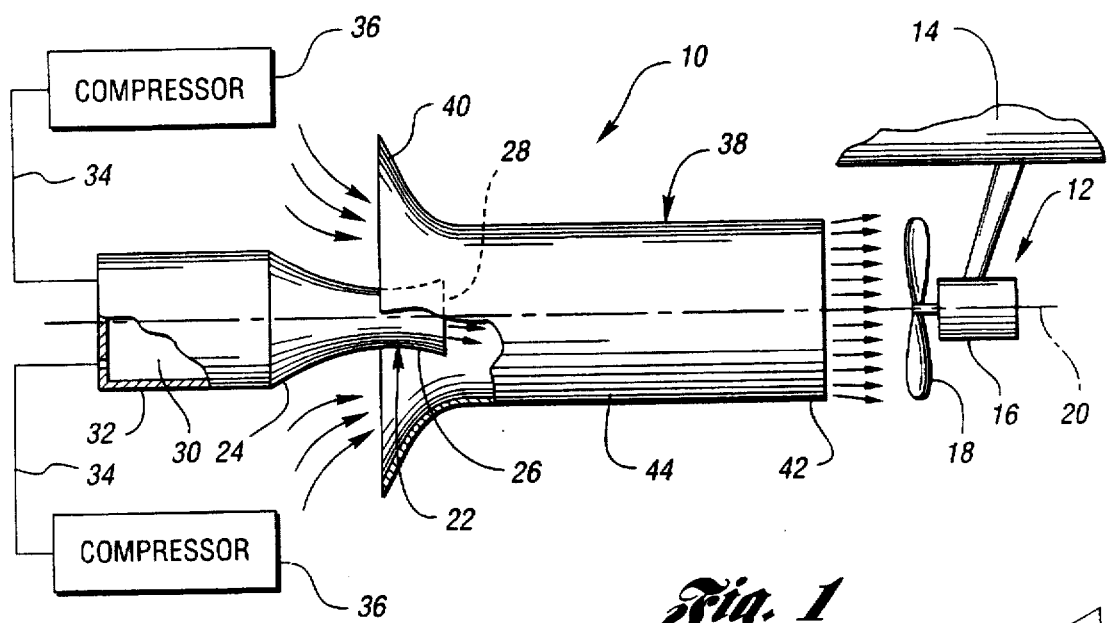
FIG. 1 is a diagrammatic schematic of an exemplary apparatus in accordance with the invention for ground-testing an air-driven generator deployed from within the fuselage of an aircraft.

Referring to the Drawings, FIG. 1 is a diagrammatic schematic of an exemplary apparatus 10 in accordance with the invention. By way of example only, as illustrated in FIG. 1, the exemplary apparatus 10 is used to ground-test an air-driven generator 12 which has been deployed from a storage position within the fuselage 14 of an aircraft. The air-driven generator 12 may be seen in FIG. 1 to include a housing 16 which supports a variable-pitch propeller 18. The propeller 18 is rotatable about a first axis 20 when subjected to a relatively-high-velocity air stream, as when the air-driven generator 12 is deployed into the air stream surrounding the aircraft's fuselage 14 during flight.

Figure 2:
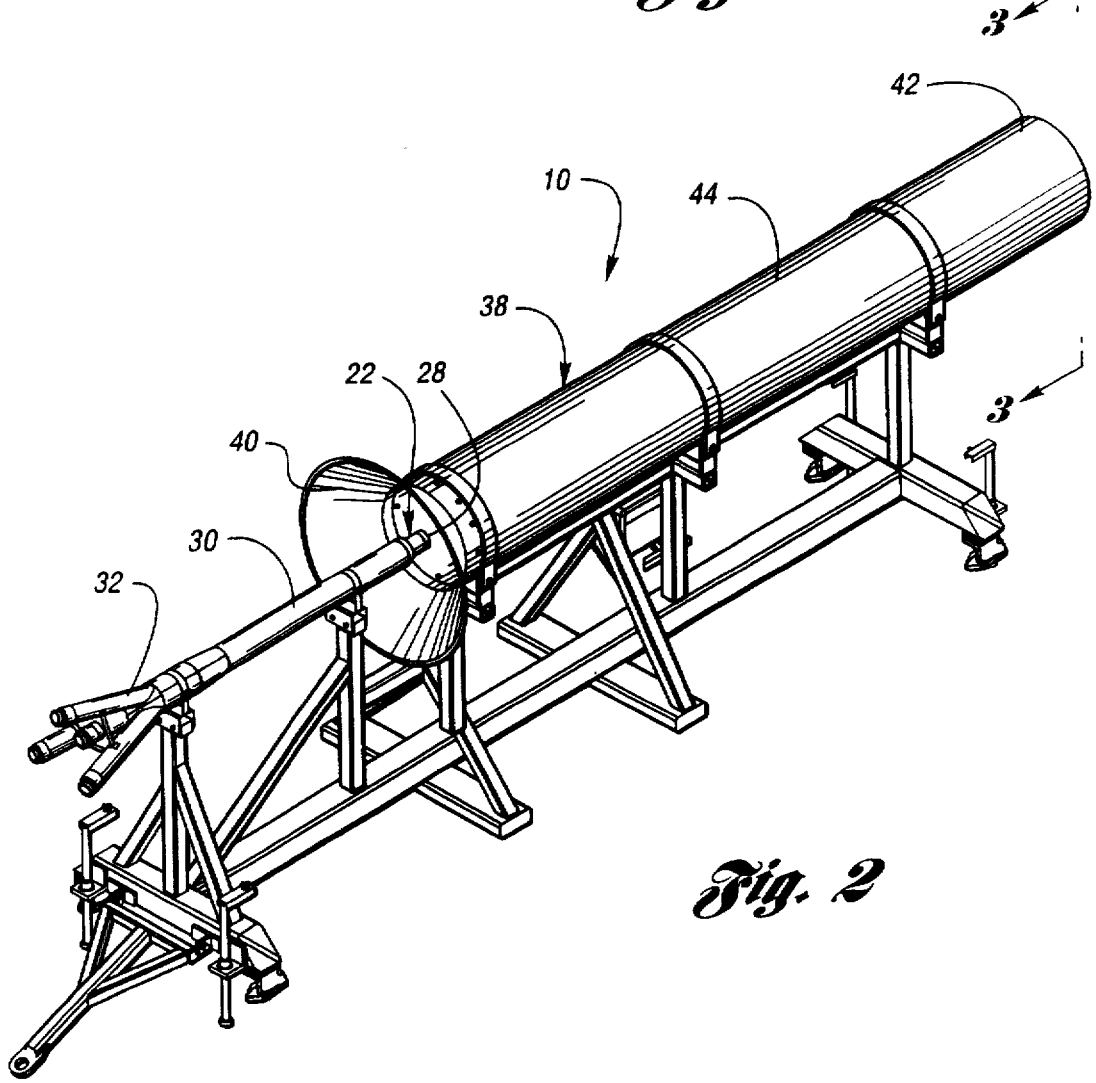
FIG. 2 is an isometric view of a constructed embodiment of the exemplary apparatus of FIG. 1.

FIGS. 2 and 3 are, respectively, an isometric view and an end view of a constructed embodiment of the exemplary apparatus 10 of FIG. 1. Referring to FIGS. 1-3, the exemplary apparatus 10 will be seen to include an annular converging-diverging nozzle 22 extending along the first axis 20. The nozzle 22 defines a nozzle entrance 24, a narrowed nozzle throat 26, and a diverging nozzle exit 28 (the divergence of the nozzle exit 28 being exaggerated in the Drawings for purposes of illustration).

A tubular manifold 30 is attached to, and is in fluid communication with, the nozzle entrance 24. The junction between the manifold 30 and the nozzle entrance 24 is preferably provided with a small internal radius (not shown) to facilitate the flow of air from within the manifold 30 into the nozzle entrance 24.

The manifold 30 includes a plurality of inlet branches 32 with which to receive one or more pressure hoses (shown diagrammatically as lines 34 in FIG. 1) from a like number of air compressors 36. In accordance with one feature of the invention, the air compressors 36 may conveniently be aircraft ground support compressors, for example, aircraft engine ground start carts. A suitable ground start cart for use with the invention is Stewart & Stevenson Air Cart Model TMAC 250, providing a nominal mass flow rate of about 250 lbm/min (1.89 kg/sec) at pressures ranging between about 5 psig (0.5 MPag) to about 40 psig (4.1 MPag). Unused inlet branches 32 are capped prior to using the exemplary apparatus 10 for ground-testing the air-driven generator 12.

The one or more compressors 36 supply a quantity of compressed air at a first stagnation pressure and a first stagnation temperature to the manifold 30. The quantity of air supplied to the manifold 30 by the compressor(s) 36 induces a first flow of air through the nozzle 22 and out the nozzle exit 28. In accordance with the invention, the first air flow is characterized by sonic flow at the nozzle throat 26 and supersonic flow at the nozzle exit 28.

Referring again to FIGS. 1–3, the exemplary apparatus 10 also includes an elongate cylindrical tube 38. The tube 38 includes an enlarged tube entrance 40, a tube exit 42, and a longitudinal mixing section 44 located between the tube entrance 40 and the tube exit 42. While the invention contemplates use of a tube mixing section 44 of any suitable configuration, the tube mixing section 44 preferably has a substantially-constant diameter, with the diameter of the tube mixing section 44 being no greater than perhaps about 100 times the diameter of the nozzle throat 26. Similarly, while the invention contemplates a tube mixing section 44 of any suitable length, empirical evidence suggests that the length of the substantially-constant-diameter tube mixing section 44 of the exemplary apparatus 10 is preferably about seven times the nominal diameter of the tube mixing section 44.

The tube 38 is positioned along the first axis 20 such that the tube entrance 40 receives the first air flow exiting the nozzle 22. More specifically, while the tube entrance 40 may be positioned in any suitable location from which to receive the nozzle's exiting supersonic air flow, the nozzle throat 26 is preferably positioned along the first axis 20 intermediate the tube entrance 40 and the beginning of the tube mixing section 44.

The first air flow exiting the nozzle 22 and flowing into the tube entrance 40 induces a second flow of air at an ambient pressure and an ambient temperature into the tube entrance 40. The first air flow is then mixed at substantially-constant-area with the second air flow in the tube mixing section 44. The mixed flow thereafter exits the tube 38 as a substantially-columnated air stream suitable for testing the operability of the air-driven generator 12.

By way of example only, where the air-driven generator's propeller 18 has a nominal diameter of 28 inches, a substantially-columnated air stream having an average velocity greater than 125 knots with a nominal diameter in excess of 28 inches is needed to test the air-driven generator 12. In accordance with the invention, an air stream traveling at in excess of 130 knots with a nominal diameter of 32 inches (0.81 m) is achieved approximately 14 inches (0.36 m) away from the tube exit 42 of an apparatus employing the following specifications:

| | |
|---|---|
| nozzle throat ID | 2.898 inches (73.61 mm) |
| nozzle exit divergence angle | 6.9 degrees |
| nozzle exit ID | 3.138 inches (79.71 mm) |
| tube entrance ID | 56 inches (1.4 m) |
| tube mixing section ID | 28 inches (0.71 m) |
| tube mixing section length | 18 feet (5.5 m) |
| stagnation pressure | 44.5 psia (4.51 MPa) |
| stagnation temperature | 325° F. (163° C.) |
| compressor requirements | two TMAC 250 carts |

Other combinations in accordance with the invention will be known to those skilled in the mechanics of fluids.

Referring now to FIG. 4, an exemplary method for ground-testing the air-driven generator 12 includes positioning the apparatus 10 such that the elongate tube 38 is aligned with the axis 20 of the generator's driving propeller 18, with the tube exit 42 positioned proximate to the propeller 18. A quantity of compressed air is supplied by one or more compressors 36 to the manifold 30 in fluid communication with the nozzle 22. The compressed air is supplied at a stagnation pressure and a stagnation temperature sufficient to induce sonic flow at the nozzle throat 26 and supersonic flow at the nozzle exit 28. In this way, the maximum possible mass flow through the nozzle 22 is achieved for the stagnation conditions within the manifold 30, and the nozzle 22 is said to be "choked."

The supersonic first air flow exiting the nozzle 22 is directed into the tube entrance 40 which, in turn, induces a second, subsonic flow of air at an ambient pressure and an ambient temperature into the tube entrance 40. The first air flow mixes with the second air flow in the longitudinal mixing section 44 of the tube 38 which, preferably, is of substantially-constant cross-sectional area. The mixed flow then exits the tube 38 to impinge upon the generator's propeller 18 as the desired testing air stream, at an exit velocity greater than about 100 knots.

As noted above, in order to achieve mixing tube exit velocities greater than about 100 knots and, more preferably in the case of ground-testing air-driven generators, greater than about 120 knots, the cross-sectional area of the tube mixing section 44 preferably exceeds the cross-sectional area of the nozzle throat 26 by a ratio of no greater than about 100.

While an embodiment of the invention has been illustrated and described, it is not intended that such disclosure illustrate and describe all possible forms of the invention. It is intended that the following claims cover all modifications and alternative designs, and all equivalents, that fall within the spirit and scope of the invention. For example, while the disclosed embodiment employs a compressor 36 to provide air at the first stagnation pressure, first stagnation temperature and first flow rate to the manifold 30, it will be appreciated that the invention contemplates use of any known source of pressurized air, including but not limited to gas generators employing controlled combustion. Similarly, while the disclosed embodiment employs a nozzle 22 having a fixed throat and exit area, the invention contemplates use of any suitable nozzle configuration providing for isentropic flow through the isentropic nozzle. Thus, the invention contemplates use of adjustable nozzles, employing, for example, a metering rod axially disposed within the nozzle's exit, the axial position of which may be adjusted so as to vary either the throat area or the exit area, or both of them. Such an adjustable nozzle may be useful, for example, to vary nozzle throat area to maintain critical flow through the nozzle notwithstanding variation in manifold stagnation pressure and temperature arising through use of different sources of compressed air, or to vary nozzle exit area to increase or decrease the velocity of the supersonic first air flow exiting the nozzle.

What is claimed is:

1. An apparatus for generating a desired air stream which is substantially columnated about a first axis, the apparatus comprising:

a converging-diverging nozzle defining a nozzle entrance, a nozzle throat and a nozzle exit, wherein the nozzle throat has a first area in cross-section;

a manifold, in fluid communication with the nozzle entrance, containing air at a first stagnation pressure and a first stagnation temperature, wherein the manifold supplies air to the nozzle entrance at the first stagnation pressure and the first stagnation temperature to induce a first flow of air through the nozzle and out of the nozzle exit, the first air flow being characterized by a choked flow condition at the nozzle throat and a supersonic flow condition at the nozzle exit; and an elongate tube extending along the first axis and defining a tube entrance and a tube exit, wherein the tube includes a mixing section having a second area in cross-section greater than the first area of the nozzle throat, and wherein the first air flow is directed into the tube to induce a second flow of air at an ambient pressure and an ambient temperature into the tube entrance, the first air flow mixing with the second air flow in the tube mixing section and exiting the tube with a velocity greater than about 100 knots.

2. The apparatus of claim 1, further including a compressor in fluid communication with the manifold, wherein the compressor supplies air to the manifold.

3. The apparatus of claim 1, wherein the first stagnation pressure is substantially greater than the ambient pressure.

4. The apparatus of claim 3, wherein the first stagnation temperature is substantially greater than the ambient temperature.

5. The apparatus of claim 1, wherein the second area of the tube mixing section is substantially constant over the length of the tube mixing section.

6. The apparatus of claim 5, wherein the ratio of the second area of the tube mixing section to the first area of the nozzle throat is no greater than about 100.

7. The apparatus of claim 6, wherein the desired air stream has an average velocity at the tube exit greater than about 120 knots.

8. The apparatus of claim 1, wherein the tube entrance has a third area in cross-section greater than the second area of the tube section, and wherein the nozzle throat is located along the first axis intermediate the tube entrance and the tube section.

9. An apparatus for ground-testing an air-driven apparatus, wherein the air-driven apparatus is responsive to an air stream traveling along a first axis at a velocity greater than about 120 knots, the ground-testing apparatus comprising:

an annular converging-diverging nozzle extending along the first axis and defining a nozzle throat and a nozzle exit, wherein the nozzle throat has a first diameter;

an elongate cylindrical tube extending along the first axis and defining a tube entrance, a tube exit, and a longitudinal mixing section located between the tube entrance and the tube exit, wherein the tube mixing section has a substantially-constant second diameter, the second diameter of the tube mixing section being no greater than about 100 times the first diameter of the nozzle throat, and wherein the nozzle throat is positioned along the first axis between the tube entrance and the tube mixing section;

a manifold in fluid communication with the nozzle; and a compressor supplying a quantity of compressed air at a first stagnation pressure and a first stagnation temperature to the manifold, wherein the quantity of air supplied to the manifold induces a first flow of air through the nozzle and out the nozzle exit characterized by sonic flow at the nozzle throat and supersonic flow at the nozzle exit, and wherein the first flow of air induces a second flow of air at an ambient pressure and an ambient temperature into the tube entrance, the first air flow mixing with the second air flow in the tube mixing section and exiting the tube as the air stream.

10. A method for generating a desired air stream substantially columnated about a first axis, the method comprising:

supplying a quantity of compressed air at a first stagnation pressure and a first stagnation temperature to a manifold in fluid communication with a converging-diverging nozzle, the nozzle having a throat and an exit, wherein the supplied quantity of air induces a first flow of air through the nozzle and out the nozzle exit characterized by a choked flow condition at the nozzle throat and a supersonic flow condition at the nozzle exit; and directing the first air flow out the nozzle exit into a first end of an elongate tube extending along the first axis to induce a second flow of air at an ambient pressure and an ambient temperature into the first end of the tube, the first air flow mixing with the second air flow in a longitudinal section of the tube and exiting from a second end of the tube at a velocity greater than about 100 knots.

11. The method of claim 10, wherein the nozzle throat has a first area in cross-section, the longitudinal section of the tube has a substantially-constant second area in cross-section, and the second area exceeds the first area by a ratio of no greater than about 100.

12. The method of claim 11, wherein the desired air stream exits the second end of the tube at a velocity greater than about 120 knots.

13. A method for testing an air-driven apparatus, the apparatus being responsive to an air stream traveling along a first axis at a velocity greater than about 120 knots, the method comprising:

positioning an elongate tube having a first end and a second end along the first axis with the second end of the tube proximate to the apparatus;

supplying, to a converging-diverging nozzle having a throat and an exit, a quantity of compressed air at a first stagnation pressure and a first stagnation temperature to induce a first supersonic flow of air at the nozzle exit;

directing the first supersonic air flow into the first end the tube to induce a second subsonic flow of air at an ambient pressure and an ambient temperature into the first end of the tube; and mixing the first air flow and the second air flow in a longitudinal section of the tube, the mixed first and second air flows exiting from the second end of the tube at a velocity greater than about 120 knots.

14. The method of claim 13, wherein the nozzle throat has a first area in cross-section, the longitudinal section of the tube has a substantially-constant second area in cross-section, and the second area exceeds the first area by a ratio of no greater than about 100.

* * * * *